US006657786B2

(12) United States Patent
Levner et al.

(10) Patent No.: US 6,657,786 B2
(45) Date of Patent: **\*Dec. 2, 2003**

(54) SYNTHESIS OF SUPERGRATINGS BY FOURIER METHODS

(75) Inventors: Daniel Levner, Toronto (CA); Martin F. Fay, Providence, RI (US); Jingming Xu, Providence, RI (US)

(73) Assignee: Digital LightCircuits, Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/144,892

(22) Filed: May 13, 2002

(65) Prior Publication Data

US 2002/0154410 A1 Oct. 24, 2002

Related U.S. Application Data

(63) Continuation-in-part of application No. 09/633,343, filed on Aug. 4, 2000, now Pat. No. 6,415,081.

(51) Int. Cl.$^7$ .............................................. G02B 27/46
(52) U.S. Cl. ............................ 359/559; 385/37; 398/87
(58) Field of Search .......................... 385/37, 129, 24; 359/130, 559; 372/102, 96; 398/87

(56) References Cited

U.S. PATENT DOCUMENTS 6,041,070 A * 3/2000 Koch ............................ 372/6
6,415,081 B1 * 7/2002 Levner ........................ 385/37

OTHER PUBLICATIONS

R.Syms and J.Cozens, "Optical guided waves and devices", McGraw Hill, 1992, pp. 169.*
I.Avrutsky et al., "Design of widely tunable semiconductor lasers and the concept of binary superimposed gratings (BSG's)", IEEE J. of Quant. Elect. 34(4), 1998(729–741).*
Design of Widely Tunable Semiconductor Lasers and the Concept of Binary Superimposed Gratings (BSG's) by Ivan A. Avrutsky et al., IEEE Journal of Quantum Electronics, vol. 34, No. 4, Apr. 1998, pps 728–741.

Extended Tuning Range in Sampled Grating DBR Lasers, V. Jayaraman et al., IEEE Photonics Technology Letters, vol. 5, No. 5, May 1993, pp. 489–491.

Broad–Range Wavelength–Tunable Superstructure Grating (SSG) DBR Lasers, Yuichi Tohmori et al., IEEE Journal of Quantum Electronics, vol. 29, No. 6, Nune 1993, pp. 1817–1823.

Multiwavelength Diffraction and Apodization Using Binary Superimposed Gratings, Ivan A. Avrutsky et al., IEEE Photonics Technology Letters, vol. 10, No. 6, Jun. 1998, pp. 838–841.

Quasicontinuous Wavelength Turning in Super–Structure–Grating (SSG) DBR Lasers, Hiroyuki Ishii et al., IEEE Journal of Quantum Electronics, vol. 32, No. 3, Mar. 1996, pp. 433–440.

\* cited by examiner

Primary Examiner—John Juba
Assistant Examiner—Leo Boutsikaris
(74) Attorney, Agent, or Firm—Harrington & Smith, LLP

(57) ABSTRACT

The present invention relates to a method for synthesizing supergratings using Fourier analysis. The method divides the synthesis process into two stages: synthesis of an "analog" grating profile, followed by a quantization step. The method provides a generalized procedure for analog synthesis by drawing on the Fourier approximation and on finite-impulse-response (FIR) filter design theory, while it interprets the simple threshold quantization as a "zeroth order" Delta-Sigma Modulator, which it improves. The method of designing a supergrating for a waveguide includes providing a reflectance spectrum in at least one spectral band to be produced by a supergrating in a waveguide, the reflectance spectrum having specified reflectance features, transforming the reflectance spectrum to a Fourier domain representation having Fourier-domain features, computationally synthesizing an analog refractive index profile corresponding to the Fourier-domain representation and transforming the analog refractive index profile to a binary or multi-level refractive index profile representation in such a way as to conserve Fourier-domain information within the spectral band.

35 Claims, 8 Drawing Sheets

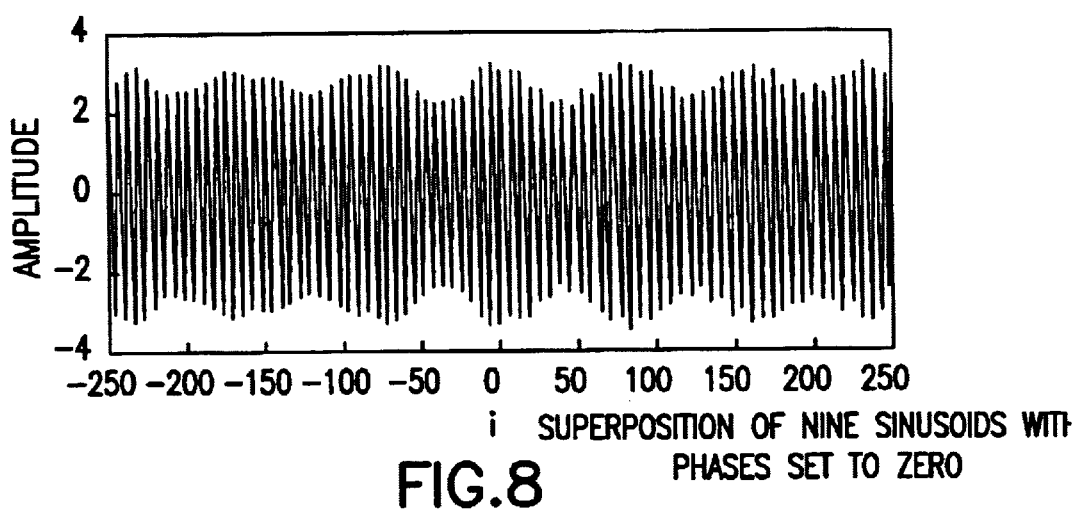
FIG.8 SUPERPOSITION OF NINE SINUSOIDS WITH PHASES SET TO ZERO
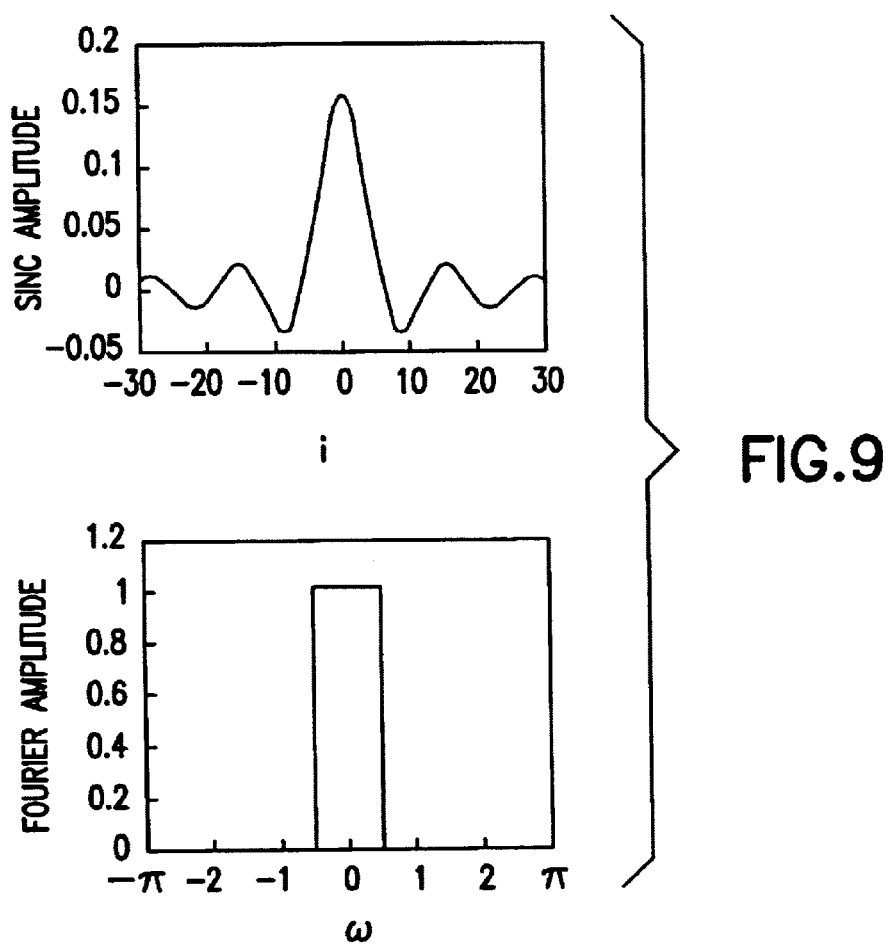
FIG.9

SYNTHESIS OF SUPERGRATINGS BY FOURIER METHODS

CROSS REFERENCE TO RELATED APPLICATION

This application is a continuation-in-part of application Ser. No. 09/633,343 filed Aug. 4, 2000 now U.S. Pat. No. 6,415,081 which is hereby incorporated by reference in its entirety.

BACKGROUND OF THE INVENTION

1. Field of the Invention

The present invention relates to a method for computationally synthesizing supergratings in waveguides to give desired reflectance spectra, and more particularly the method relates to synthesizing supergratings using Fourier analysis.

2. Prior Art

Gratings are optical devices used to achieve wavelength-dependent characteristics by means of optical interference effects. These wavelength-dependent optical characteristics can, for instance, serve to reflect light of a specific wavelength while transmitting light at all other wavelengths. Such characteristics are useful in a wide range of situations, including the extraction of individual wavelength-channels in Wavelength Division Multiplexed (WDM) optical communication systems, or providing wavelength-specific feedback for tunable or multi-wavelength semiconductor lasers.

The term "multi-wavelength grating" generally refers to a grating that is capable of controlling optical characteristics at a number of wavelengths, such as a grating that reflects light at several select wavelengths (which may correspond to specific optical communication channels) while remaining transparent to light at other wavelengths. In some situations, however, there is a need to set the optical characteristics for a continuous range of wavelengths, rather than at specific wavelength values. This is the case when trying to compensate for the unevenness of optical gain profiles in laser cavities and optical amplifiers by means of a grating. This latter type of specification is usually difficult to meet with traditional grating technologies.

Gratings are usually implemented by modulating (varying) the effective index of refraction of a wave-guiding structure. The variation of refractive index along the length of the grating is often referred to as the "index profile" of the grating. These changes in index of refraction cause incident light to be reflected.

In the case of an abrupt interface between two index values, light incident directly on the interface is reflected according to the Fresnel reflection law:

$$\frac{E_r}{E_i} = \frac{n_i - n_{i+1}}{n_i + n_{i+1}} \qquad \text{(Eq. 1)}$$

where $E_i$ and $E_r$ are the incident and reflected electric fields at the interface, respectively, and $n_i$ and $n_j+_j$ are the refractive index values on either side of the interface, see FIG. 1. Although this reflection phenomenon is most striking for refractive index steps, it also occurs in a more complicated form with a continuous refractive index. Grating devices utilizing both types of reflection phenomena exist. A grating derives its wavelength-dependent character from optical interference effects. This phenomenon is illustrated in FIG. 2: incident light is reflected by each grating feature (step change in index of refraction) and interferes, either constructively or destructively, to generate a wavelength-dependent reflectance spectrum. At a certain wavelength, all the individually weak reflections add up constructively, leading to strong grating reflectance. At a different wavelength, however, the phase relation between the individual reflections is different and the beams may add up to produce little or no grating reflectance, transmitting most of the light.

Gratings may be "written" into the optical wave-guide in a variety of different ways, depending primarily on the material used. Fiber or glass guides, for example, often make use of photorefractiveness, a property of specially prepared glasses that allows their refractive index to be varied by exposing them to high intensity light (typically in the ultraviolet). Semiconductor gratings, on the other hand, are usually implemented as surface-relief gratings by etching a grating pattern into the surface of the semiconductor guide (which may then be buried following subsequent deposition). Etching the surface of the waveguide does not affect its real refractive index as photoinscription does, but rather varies the guide's effective index. Nevertheless, this difference does not affect the operation of the grating.

A simple and common grating device known as a Bragg Grating is illustrated in FIG. 3. The Bragg Grating consists of a periodic variation in refractive index and acts as a reflector for a single wavelength of light related to the periodicity (known as pitch, A) of the index pattern. It is frequently used in both semiconductor systems and fiber-optic systems, where it is known as a Fiber Bragg Grating. The Bragg Grating can actually reflect at several wavelengths, corresponding to overtones of its fundamental pitch, which satisfy the relation:

$$\lambda = 2\Lambda n_{eff}/N \qquad \text{(Eq. 2)}$$

where N is a positive integer (typically 1 for the design wavelength) and the average effective index $n_{eff}$ is generally wavelength-dependent. However, these higher-order wavelengths tend to be at quite different spectral regions than the fundamental, thus not making the Bragg Grating useful as a multi-wavelength reflector. Moreover, these higher-order wavelengths cannot be tuned independently of one another.

Wavelength Division Multiplexing (WDM) is a technology where many communication channels are encoded into a single optical cable by utilizing different wavelengths of light. Gratings are often used to separate or process these channels. Older grating technologies can process one wavelength at a time, forcing devices intended to process multiple wavelengths to employ a cascade of single-wavelength gratings. This is not an attractive solution because, on top of the additional losses that each grating creates, even a single grating occupies a considerable amount of space by today's standards of integration. It is thus desired to have a single device capable of processing several wavelengths in a space-efficient manner.

A similar situation occurs in the realm of semiconductor lasers. It is widely accepted that WDM technology would greatly benefit from lasers capable of generating light at several wavelengths. The output wavelength of semiconductor lasers is largely determined by the presence of "feedback elements" around or inside the laser gain section, which act to reflect light at the desired wavelength back into the laser. For multi-wavelength operation, multi-wavelength feedback is needed. Again, single-wavelength grating technology can only address this demand with a cascade of Bragg Gratings, leading to the same (if not more notable) loss and space problems mentioned above. The conclusion is the same: there exist a need for a single device capable of generating multi-wavelength reflection and transmission spectra in a space- and resource-efficient manner.

There are several multi-wavelength grating technologies: analog superimposed gratings, Sampled Gratings (SG), Super-Structure Gratings (SSG) and Binary Supergratings (BSG). The binary supergrating is also known as a binary superimposed grating, for historical reasons. BSG development was originally motivated by a desire to emulate the superposition of multiple conventional Bragg gratings, hence the term "binary superimposed grating". Since then, synthesis techniques have evolved to allow the emulation of arbitrary diffraction characteristics, a flexibility better captured by the term "binary supergrating".

Analog superimposed gratings are a generalization of the Bragg Grating and are rooted in a principle of superposition: a grating profile consisting of the sum of the index profiles of single-wavelength gratings reflects at all of its constituent wavelengths. Such a grating relies on an analog index variation, that is, a refractive index that changes continuously along the grating length (FIG. 4). It is this analog nature of the profile that limits the functionality of these gratings: it is difficult to inscribe strong analog gratings using the photorefractive effect, as the change of index under illumination varies non-linearly with stronger exposures, making the writing process difficult. In semiconductors, where surface relief gratings are used, the situation is even worse as it is currently impossible to reproducibly etch analog features into the surface. The latter difficulty brought about the introduction of binary gratings, gratings that rely only on two refractive index values corresponding to the material being etched or not etched, illuminated or not illuminated.

Sampled gratings (SG) and superstructure gratings (SSG) represent two binary implementations of multi-wavelength gratings. The SG comprises alternating sections of grating and grating-free regions, and earns its name because it can be thought of as a grating which is sampled at specified intervals, see IEEE Photonics Technology Letters 5 489–491 (1993). This sampling produces diffraction spectra consisting of multiple reflectance peaks contained within a (typically) symmetric envelope. The SG is intrinsically limited in the flexibility in the location and relative strength of reflectance peaks, and, because of the large fraction of grating-free space, is also wasteful of real estate. The SG is therefore particularly unsuitable where a short grating is required or where waveguide losses are high.

With the super-structure grating (SSG), the grating period is chirped by finely varying the grating pitch, which corresponds to the length of one tooth-groove cycle. This can also be thought of as a sequence of finely-tuned phase shifts; common phase profiles include linear and quadratic chirp. Such an implementation in principle allows arbitrary peak positions and relative heights, but only at the expense of extremely high resolution, corresponding to a very small fraction of the size of the grating teeth themselves. For a typical semiconductor implementation, lithographic resolution of the order of 1 nm is required, see IEEE J. Quantum Electronics 29 1817–1823 (1993) and IEEE J. Quantum Electronics 32 443–441 (1996).

One method of BSG synthesis is presented in Ivan A. Avrutsky, Dave S. Ellis, Alex Tager, Hanan Anis, and Jimmy M. Xu, "Design of widely tunable semiconductor lasers and the concept of Binary Superimposed Gratings(BSG's)," IEEE J. Quantum Electron., vol. 34, pp. 729–740, 1998.

This older method addresses the synthesis of "multi-peak" gratings, gratings characterized by reflectance at several "peaks", which can be controlled in their position and strength. In this method, the designer begins with a set of sinusoids, each corresponding to a single reflectance peak and weighted according to that peak's relative strength. These peaks are added together (i.e. superimposed; hence the BSG was initially known as a superimposed grating) to produce an "analog profile". This profile is then quantized by a simple threshold method: if the analog profile value at a point is positive, let the corresponding BSG segment be of the high index value; if it is negative, let the corresponding BSG segment be of the low index value. This method was sufficient to illustrate the BSG's superiority in flexibility, efficiency and robustness when compared to prior multi-wavelength grating technologies, including the SG and SSG. However, it suffers from two deficiencies: firstly, the threshold quantization process introduces intermodulation distortion (see the IDSM section), which largely limits the applicability of BSGs synthesized this way to active applications (laser feedback elements and the like). Secondly, this synthesis procedure is limited to multi-peak gratings, and offers little or no control over the individual peak shape. It is entirely incapable of generating flat-top channels, as desired by some communication applications, and of generating the near-arbitrary reflectance spectra demanded by some gain- and dispersion-compensation schemes. On a positive note, however, none of the prior (competing) grating technologies were capable of addressing these demands either.

Other methods of BSG synthesis include these trial-and-error methods which are most often computationally intractable. Therefore, it is desirable to have a methodology that provides a more rigorous approach to methods of BSG synthesis.

SUMMARY OF THE INVENTION

The foregoing and other problems are overcome, and other advantages are realized, in accordance with the presently preferred embodiments of these teachings.

In accordance with one embodiment of the invention a method for designing a waveguide supergrating is provided. The method includes the step of providing a reflectance spectrum having specified reflectance features to be produced by the supergrating in at least one spectral band. Transforming the reflectance spectrum to a Fourier-domain representation having Fourier-domain features and generating an analog refractive index profile corresponding to the Fourier-domain representation. The method includes the step of transforming the analog refractive index profile to a refractive index profile representation using an effective transformation that conserves Fourier-domain information and, wherein the refractive index profile comprises a plurality of refractive indexes.

In accordance with another embodiment the invention includes a waveguide having at least one supergrating. The supergrating(s) exhibits refractive properties according to at least one refractive index profile derived from an analog index profile, which in turn corresponds to a Fourier domain representation of a reflectance spectrum.

The invention is also directed towards a program storage device readable by a machine, tangibly embodying a program of instructions executable by the machine to perform method steps for designing a waveguide supergrating. The method includes the step of providing a reflectance spectrum having specified reflectance features to be produced by the supergrating in at least one spectral band. Transforming the reflectance spectrum to a Fourier-domain representation having Fourier-domain features and generating an analog refractive index profile corresponding to the Fourier-domain representation. The method includes the step of transforming the analog refractive index profile to a refractive index profile representation using an effective transformation that conserves Fourier-domain information and, wherein the refractive index profile comprises a plurality of refractive indexes.

BRIEF DESCRIPTION OF THE DRAWINGS

The foregoing aspects and other features of the present invention are explained in the following description, taken in connection with the accompanying drawings, wherein:

FIG. 8 is a plot showing the optimal superposition of the nine sinusoids in FIG. 7 in which the phases are chosen to give a flattened envelope and the amplitude is 2.64 times smaller;

FIG. 9 is a plot of the sinc function and its spectrum for $\delta\omega=0.5$;

DETAILED DESCRIPTION OF THE PREFERRED EMBODIMENT

Figure 1:
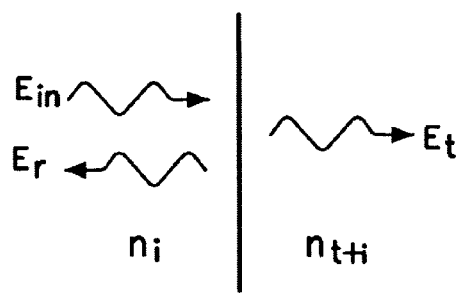
FIG. 1 is a diagram illustrating Fresnel reflection at an index step interface.
Figure 2:
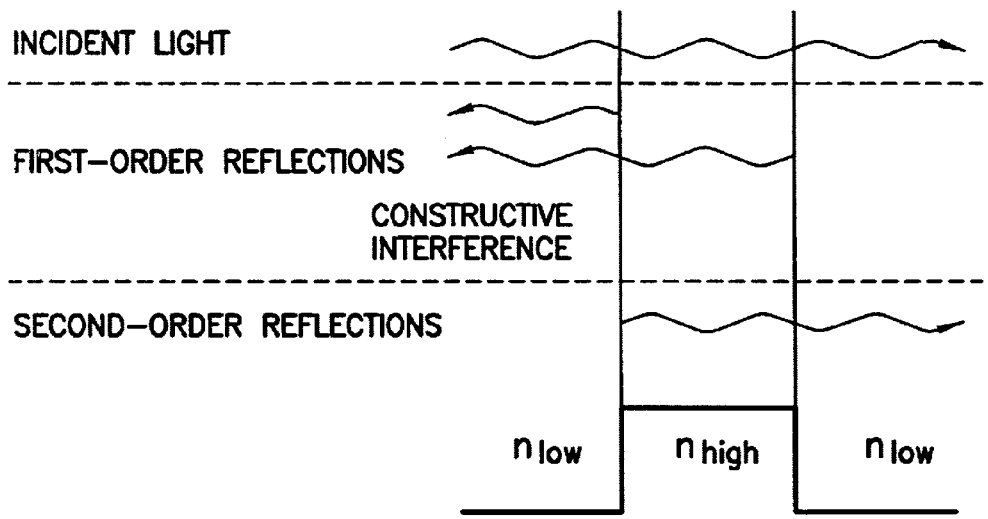
FIG. 2 illustrates internal reflections and interference of light in a binary grating produced by periodic changes in index of refraction along a length of an optical fiber.
Figure 3:
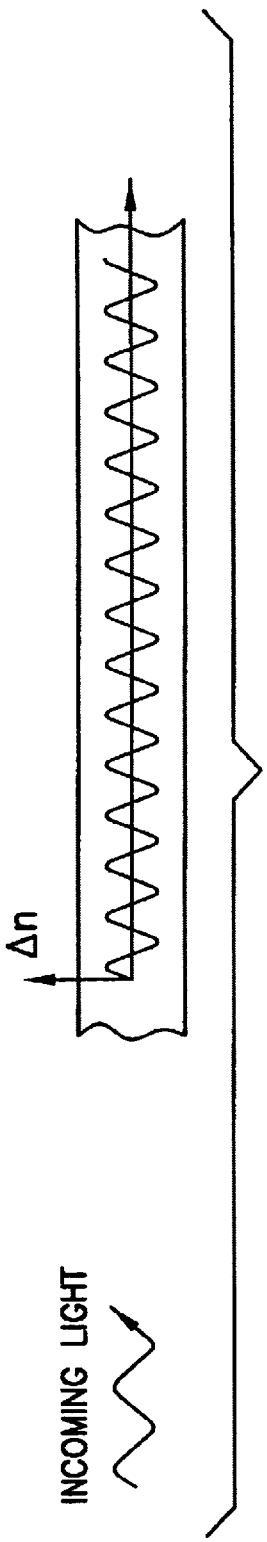
FIG. 3 is a perspective view of a fiber Bragg grating.
Figure 4:
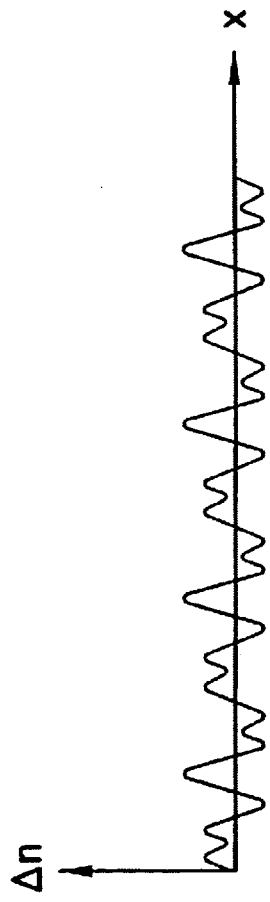
FIG. 4 is an analog index profile from a plot of refractive index change versus distance (x)
Figure 5:
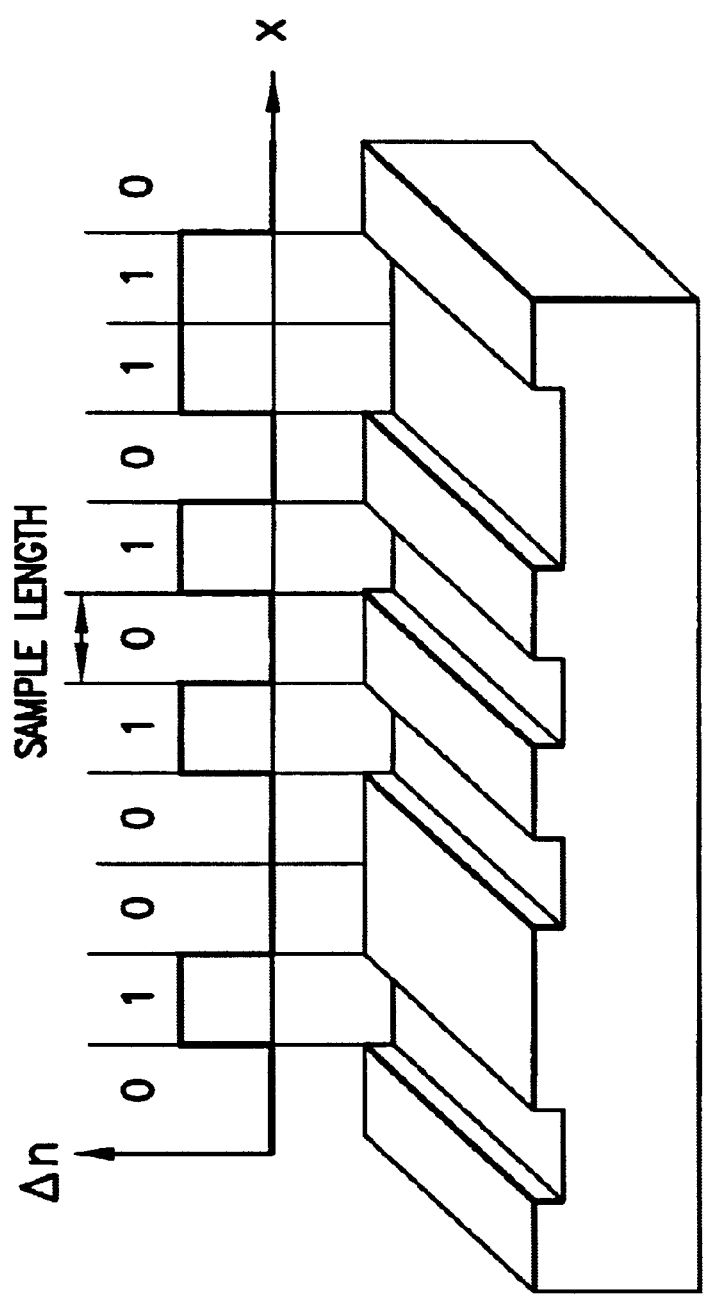
FIG. 5 shows a BSG index profile of Δn versus distance x and the corresponding surface-relief implementation.
Figure 15:
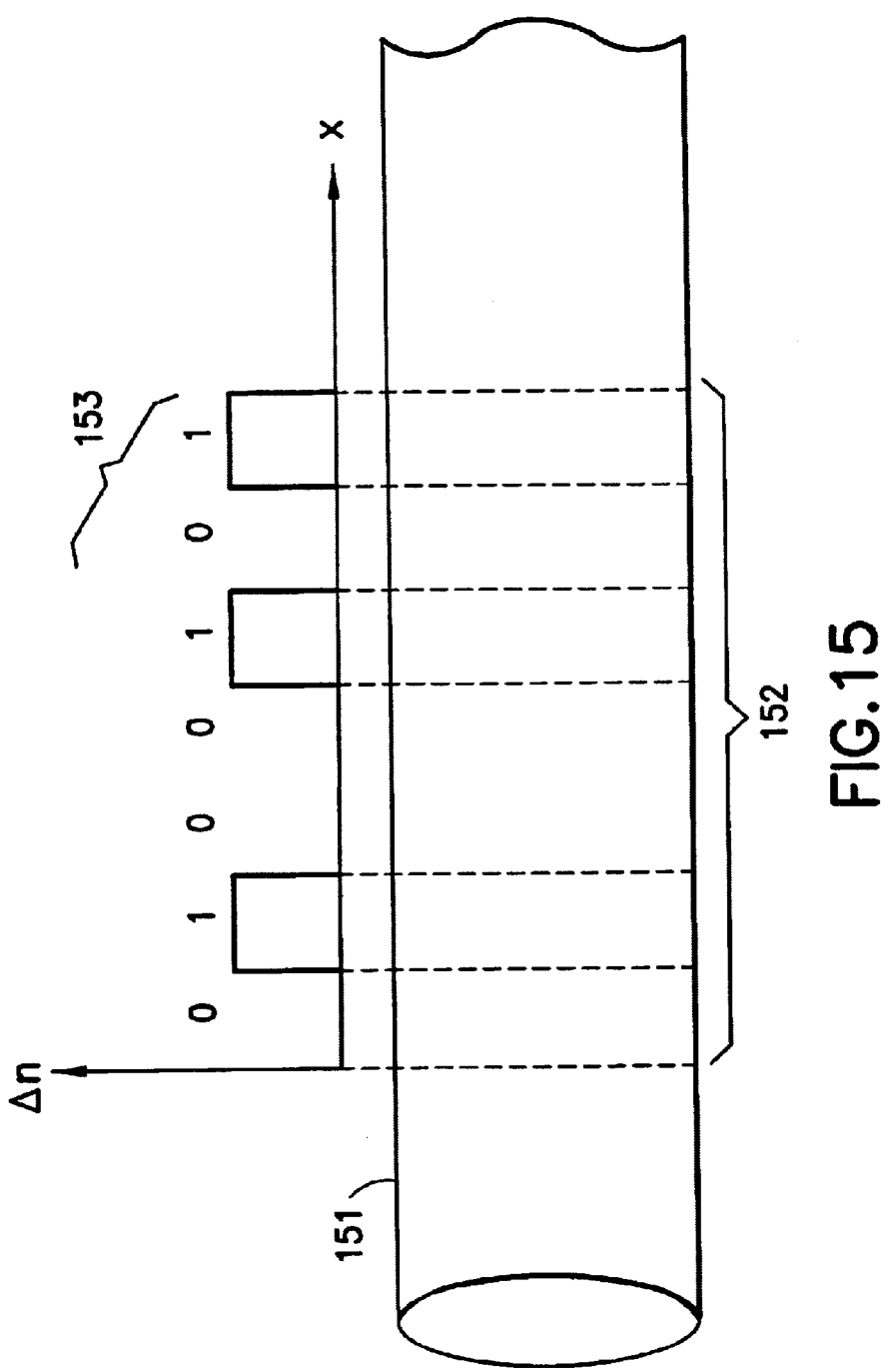
FIG. 15 shows a BSG index profile of Δn versus distance x and a corresponding fiber-optic implementation.

There are two main properties that define the binary supergrating in relation to other grating technologies. The first is that the BSG relies on a discrete number of refractive index levels. This number is historically 2 and hence the BSG is known as a binary grating. However, any suitable number of refractive index levels may be chosen. The second defining trait of the BSG is that it is a sampled structure characterized by a sample length. This refers to the fact that transitions between the grating's index levels cannot occur at arbitrary positions, but, rather, preferably occur at multiples of the sample length. The BSG is strikingly similar in definition to the familiar notion of a digital signal, namely a discrete sampled waveform. Viewed as such, the BSG can be described by a series of (often binary) digits, indicating the refractive index setting at each sample point. FIG. 5 shows a BSG index profile of Δn versus distance x and a corresponding surface-relief implementation. FIG. 15 shows a BSG index profile of Δn versus distance x and a corresponding fiber-optic implementation.

BSG design involves several key choices: selecting the refractive index levels for the device, as determined from material parameters and lithographic or photoinscription constraints; determining the desired sample length, considering the wavelength range important for the grating and the available lithographic resolution; setting a total device length for the grating, limited by the available physical space and the technological limitations of the inscribing process; and choosing the refractive index pattern of the sample-length sized segments that will produce the desired reflectance or transmittance characteristics.

Synthesis Overview

The method BSG synthesis as disclosed herein includes the following steps:

The conversion of grating's reflectance specifications to the Fourier domain.

The reflectance specifications of the desired reflectance spectrum to be produced by the supergrating is converted to the Fourier domain. Such a conversion is mainly direct: using the Fourier approximation, Fourier domain features can be set equal to the reflectance features. In addition, this process can account for various inaccuracies of the approximation in order to improve the final result.

Synthesis in the Fourier domain

Guided by the Fourier approximation, the designer may initially design the grating by its Fourier spectrum. BSG synthesis thus becomes a problem in finite-impulse-response (FIR) filter design, allowing the many available FIR design techniques to be applied.

Quantization

Standard FIR design techniques produce an "analog" index profile. To constitute a proper BSG, this index profile is transformed into a binary or multi-level form. Drawing on the Fourier approximation again, designer may use any quantization technique that operates on the basis of conserving Fourier information within a spectral band. Delta-Sigma modulation is one such preferred technique that is capable and efficient.

Evaluation of the error and iteration

Once synthesized, the BSG's true reflectance may be calculated using an exact technique such as the transfer matrix method. The Transfer Matrix Method (TMM) is an industry-standard method for the computation of grating reflectance spectra. It is an exact technique, and thus reveals the inaccuracies of the Fourier approximation. This calculation will reveal the inaccuracies of the Fourier approximation, quantifying an error that can be taken back into the Fourier domain and added to the result of step i). This process can be repeated as necessary, although one repetition is often sufficient. Each of these steps, the underlying theory of each of the process steps and preferred embodiments are discussed hereinafter.

The Fourier Approximation

The Fourier approximation is a mathematical relation that embodies the notion that a grating's reflectance spectrum is related to its periodicity: single-wavelength gratings have reflectance spectra characterized precisely by their periodic structure, and simple superimposed gratings have reflectance spectra characterized by their wavelength components. This notion may be generalized to suggest that the reflectance spectrum of a grating is related to the Fourier transform of its structure, the Fourier transform being the standard method for evaluating the "frequency content" or "wavelength content" of a waveform. This generalization can be supported mathematically by a variety of derivations that result in similar forms of the Fourier approximation. The Fourier approximation is thus a mathematical relation stating that, within certain parameter domains, a grating's reflectance characteristics are strongly related to the wavelength content of its structure, as expressed by the Fourier transform of its index profile. Nonetheless, it is important to remember that the Fourier approximation is, after all, only an approximation, meaning that it never produces exact results but only results that are "good enough".

In the context of the BSG, the Fourier domain therefore corresponds to spatial frequency $1/\Lambda$, which relates to the corresponding reflected optical wavelength $\lambda$ according to $1/\Lambda = 2n_{eff}/\lambda$, where effective index $n_{eff}$ is generally wavelength-dependent.

The usefulness of the Fourier Approximation for BSG synthesis comes from the fact that the Fourier approximation provides a means for generating a refractive index profile from the designer's reflectance specifications, by means of the inverse Fourier transform. Unfortunately, this process generates an "analog" profile and not the two-level profile needed for a BSG, the latter is achieved by quantizing the analog index profile using a Delta-Sigma Modulator (DSM).

Delta-sigma Modulation

By its definition, the BSG utilizes only a small number of refractive index values. However, synthesis techniques based on the Fourier approximation alone make it difficult to directly generate profiles employing only the allowed indices. For this reason it is more convenient to split the synthesis process into two parts: a procedure that produces an "analog" (non-quantized) grating profile, followed by a quantization process that converts the analog profile into a BSG.

Historically, two-level quantization was achieved in a very simple manner: positive analog samples were converted to the high index value, and negative samples to the low index value. This technique will be referred to as threshold quantization. While it is rather effortless, threshold quantization does not always produce satisfactory results: being a highly non-linear process, threshold quantization produces a distortion effect known as intermodulation. Intermodulation is especially evident in "multi-peak" gratings, where it is expressed as additional peaks that appear at characteristic locations. Even worse is the fact that threshold quantization is poorly suited to emulate index profiles with varying amplitude, and simply cannot emulate characteristics such as flat-top (square) channels.

Figure 6:
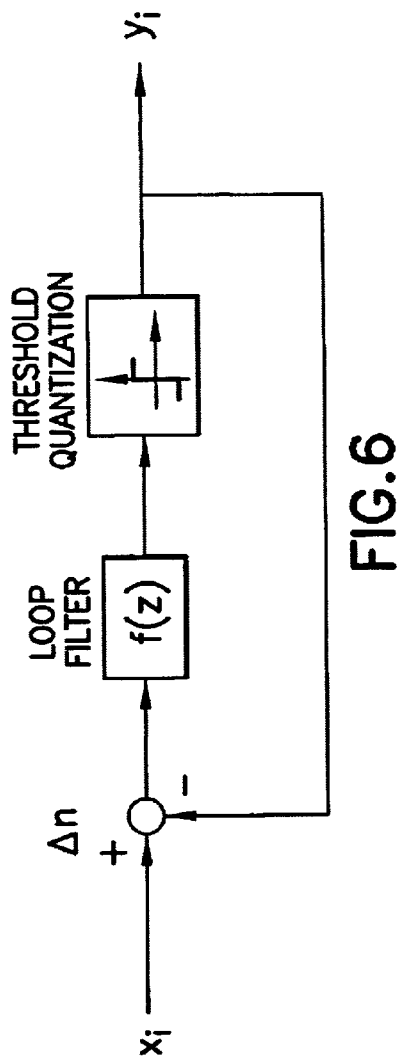
FIG. 6 is a block diagram showing a standard topology for Delta-Sigma modulation.
Figure 7:
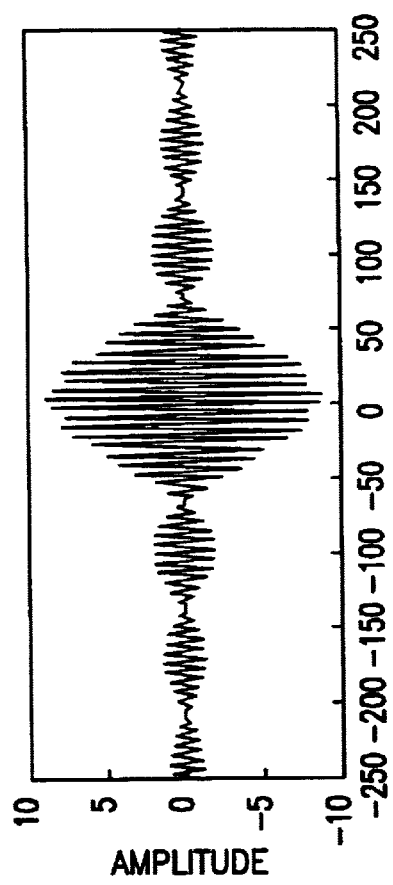
FIG. 7 is a plot of the superposition of nine sinusoids with phases set to zero.

An alternative form of quantization, which originates from work on analog-to-digital converter circuits, is Delta-Sigma modulation (DSM). The name Delta-Sigma modulation is historical and originates from the fact that some of the first modulators used a summation operation (Sigma) as the filter. The Delta refers to the difference block at the input. DSM is a feedback process that improves quantization by making use of the measured quantization error. That is, DSM quantizes its input using a simple threshold, but rather than doing so blindly it keeps track of any important information that is lost by the quantization and feeds this information back into its input. A typical structure for DSM is shown in FIG. 6.

Grating Specifications in the Fourier Domain

The desired reflectance spectrum can be converted to the Fourier domain, in which synthesis will be done, by mapping the optical wavelengths onto a mathematically suitable frequency variable and transforming the desired reflectance values using some saturation function (this comes about from the mathematics of the Fourier approximation). For example, this can be accomplished by directly relating the specified (or desired) reflectance spectrum (plotted as a function of optical frequency $v=c/\lambda$) to the spatial-frequency spectrum to be produced by the supergrating (plotted as a function of spectral frequency $1/\Lambda$, where $\Lambda$ is spatial period). In this case the transformation is achieved by simply converting the frequency coordinates: $1/\Lambda = 2n/\lambda$, wherein n is an average effective index of refraction and is a function of wavelength $\lambda$. In addition, the designer may improve synthesis by bringing into account some of the approximation errors expected from the Fourier approximation.

Synthesis in the Fourier Domain

Once the specifications are converted to the Fourier domain, BSG synthesis essentially becomes a problem in FIR filter design. There are many established techniques and methodologies for FIR filter design that can be readily used for BSG synthesis, the method is not restricted to any specific ones. However, there are several techniques and situations that are common and illustrate Fourier synthesis. Three common problem types and their corresponding Fourier synthesis are shown.

Synthesis of Simple Peaks

In some situations, such as with laser feedback elements, the BSG is asked to reflect light at a given set of wavelengths, and to do so with the highest wavelength selectivity possible. That is, the specification is for simple peaks with minimal channel width. This situation corresponds to the BSG'S synthesized by the older synthesis methodology. such peaks can be derived from the superposition of simple sinusoidal profiles:

$$\sum a_i \cos(\omega_i x_i + \phi_i) \qquad (Eq. 3)$$

where $a_i$, $\omega_i$ and $\phi_i$ are the amplitude, frequency and phase of the $i^{th}$ peak, respectively and $x_i$ is the position along the profile.

Most situations dictate the amplitude coefficients. However, many do not require anything specific of the phase. In such situations, the BSG designer has access to an important degree of freedom.

To illustrate the importance of phase, one may set all the phases in the superposition to zero. The resulting waveform displays a peaked envelope reflecting the constructive interference around the zero point. Since the waveform is preferably scaled according to its peak value before quantization, the waveform here represents an inefficient use of area: most of the grating's reflectance comes from its middle, while the sides contribute little.

The situation can be remedied with proper selection of phase. Component phases should be selected such that they minimize the maximum height of the superposition (which consequently flattens the overall envelope), given the component amplitudes. The use of phase information to produce a flat envelope can greatly increase the efficiency of the grating. This illustrates a general principle of BSG design according to the present invention: the analog index profile (before quantization) preferably has an envelope that is as flat since a flat envelope represents a distribution of the spectral features along the length of the device and makes better use of the index modulation. The grating's "reflective power", resulting from the available index modulation, is a resource that is distributed along the grating's length and utilized in that fashion.

Phase optimization can bring about large increases in a BSG's reflective efficiency. Herein lies one of the advantages of the present invention: increasing the number of reflective peaks produces a sub-linear increase in the index modulation required for maintained peak strength (assuming fixed grating length). That is, in order to double the number of peaks but maintain the same peak reflectance, the index step does not need to be doubled. Avrutsky et al. suggest that this relationship is of a square-root nature: e.g. quadrupling the number of peaks requires only a doubling in index step. This is not so with other multi-wavelength grating devices.

Synthesis of Bandpass Channels

A grating is often required to separate or select wavelength division multiplexed optical communication channels. These channels are described by their wavelength (position) and their bandwidth (width). They are also typically accompanied by specifications of the strength of the reflection and the spectral flatness of the channel. Such bandpass filter design is commonly encountered in FIR filter theory, and thus many approaches to its solution exist. The technique presented here is based on the method of windowing.

The main principle in the synthesis of structured spectra such as the bandpass filter is the use of analytically determined solutions to an approximated design problem: certain filter shapes, such as the flat-top filter, are known to correspond to certain mathematical functions. For example, the sinc function with the form:

$$\frac{\delta\omega}{\pi}\mathrm{sinc}(\delta\omega i) = \frac{\sin(\delta\omega i)}{\pi i} \quad \text{(Eq. 4)}$$

where i is the BSG segment number, corresponds to an ideal lowpass filter of width $\delta\omega$. This filter can be converted into a bandpass filter centered about the frequency $\omega$ by multiplying it with an appropriate sinusoid, resulting in the filter:

$$\frac{\Delta\omega}{\pi}\cos(\omega_c i)\mathrm{sinc}\left(\frac{\Delta\omega}{2}i\right) \quad \text{(Eq. 5)}$$

where the peak is centered about $\omega_c$ and has a width of $\Delta\omega$. This filter, characterized by an abrupt transition from the passband to the stopband, requires an infinite length for its implementation. Simply cropping the filter to the desired length produces undesirable oscillatory features known as Gibbs phenomena. This is a common issue in FIR design, and one approach to its solution is the method of windowing.

The method of windowing views cropping as a multiplication by a window function that is zero in the cropped regions. The theory views the simple cropping operation as multiplication by a "rectangular window" which equals unity within the region to be kept, and 0 outside in the sections to be cropped. The theory argues that this rectangular window is responsible for the Gibbs phenomena. In turn, it can suggest other window shapes that will not.

All window functions that can be used for cropping make the bandpass filter non-ideal by producing a finite "transition width" between the passband and the stopband, in contrast to the ideal filter, which requires no width for the transition. The transition behavior and rate vary amongst the possible windows. FIR filter theory suggests several good window functions. One attractive possibility is the Kaiser window, a window function conceived with the ideal lowpass (and thus bandpass) filter in mind, and which allows the designer to customize the transition characteristics through a parameter $\beta$. The Kaiser window is thus suitable for BSG synthesis and provides the added flexibility of controlling the shape and sharpness of the reflectance channels. However, it will be appreciated by those skilled in the art that this is only one of many FIR techniques that may be used to achieve this result, the BSG synthesis by Fourier methods disclosed herein is not restricted to this particular method.

Figure 10:
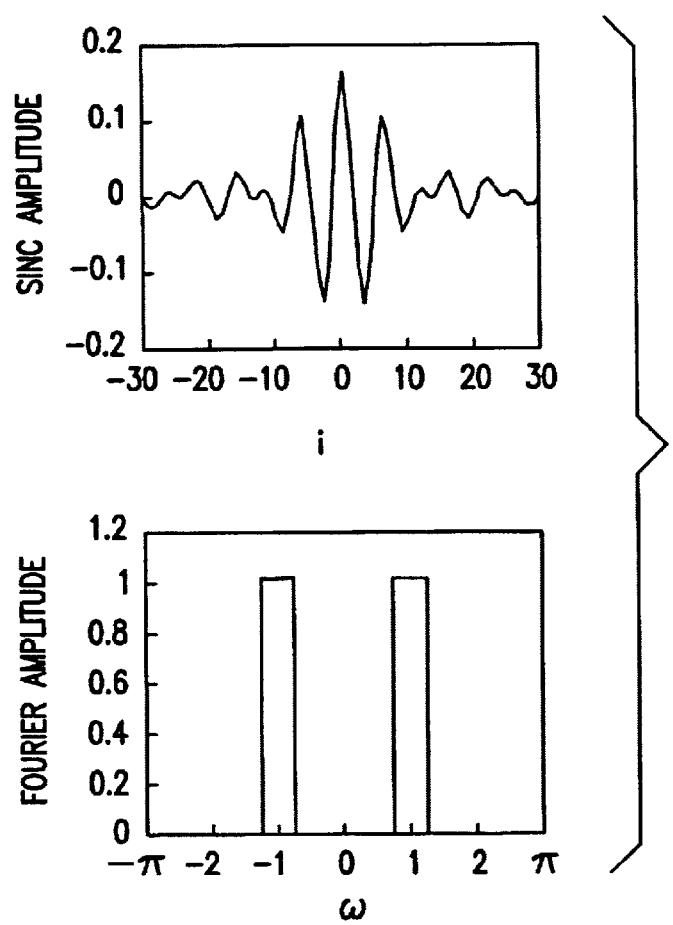
FIG. 10 is a plot of the modulated sinc and its spectrum for $\Delta\omega=0.5$ and $\omega_c=1$.
Figure 11:
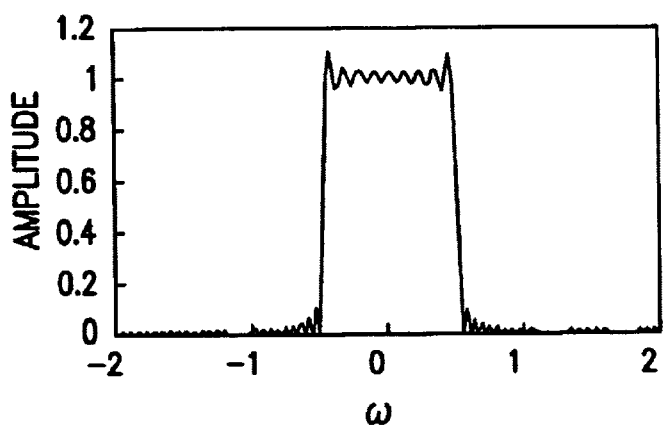
FIG. 11 is a plot showing the Gibbs oscillations due to the improper truncation of a sinc.
Figure 12:
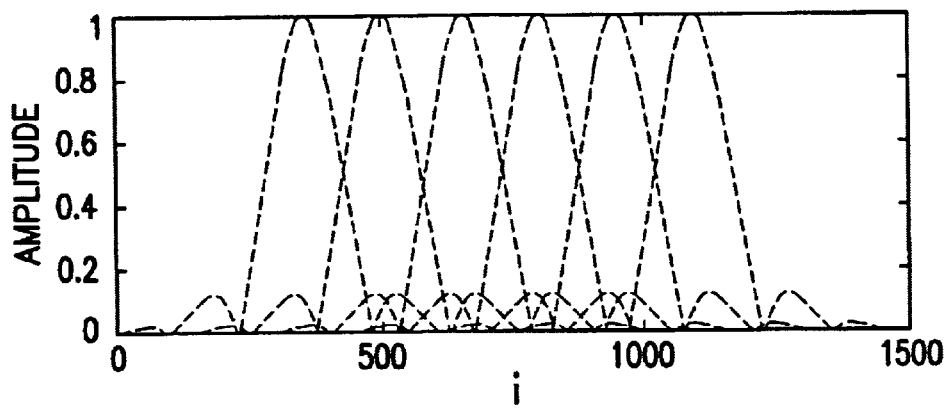
FIG. 12 is a plot showing a staggered sinc profile.
Figure 13:
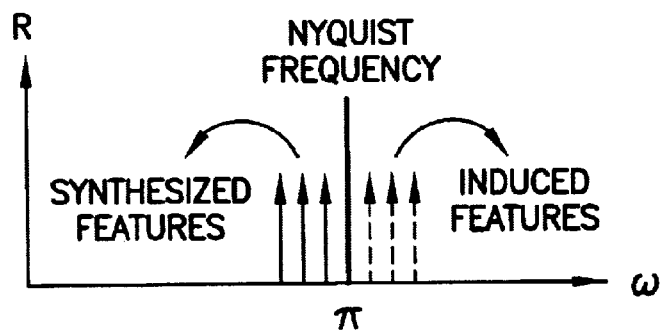
FIG. 13 illustrates synthesis of a BSG using induced-symmetry.
Figure 14:
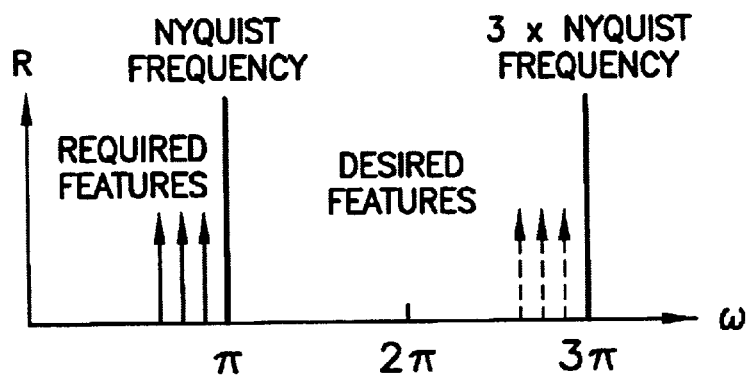
FIG. 14 illustrates synthesis of a BSG using super-Nyquist synthesis.

Examining FIG. 10 reveals that the analog profile corresponding to a flat-top channel makes most use of the center of the grating. As with the multi-peak case, this situation is undesirable as it makes inefficient use of grating resources away from the center. A convenient solution to this problem is to stagger the waveforms associated with individual channels when superimposing them. Together with a phase-optimization technique such as that used for the multi-peak grating, this procedure can enable very efficient use of the grating's resources.

It will be appreciated that any suitable function for deriving a superposition of profiles corresponding to a set of pre-selected wavelengths and band shapes given by:

$$\sum_i F_i(x + \Delta x_i)\sin(k_i x + \phi_i)$$

where $F_i$, $k_i$, $\phi_i$, $\Delta x_i$ are the envelope function, frequency, phase and envelope shift of the $i^{th}$ profile respectively, may be used; and where phases ($\phi_i$) and envelope shifts ($\Delta x_i$) of component profiles are preferably selected to result in a substantially flat envelope for the superposition of profiles.

Synthesis by Discrete Fourier Transform (DFT)

In some applications the reflectance specifications do not correspond to particular elementary shapes such as bandpass channels or peaks. Gain compensation profiles for optical amplifiers and dispersion-compensation gratings fall into this category. Gratings satisfying such requirements may be synthesized using the discrete Fourier transform (DFT).

The discrete Fourier transform and the related fast Fourier transform (FFT) are versions of the Fourier transform that operate on a finite number of sampled points. Being related to the regular Fourier transform, the Fourier approximation and its implications on BSG synthesis carry over to the DFT.

A DFT operating on a set of 1 points returns a set of ½ independent frequency components. Thus, when designing a grating with I segments the designer may assign reflectance values at ½ wavelengths, but not between them.

BSG synthesis using the DFT is carried out as follows: the frequency-domain specifications are inserted into an array of length I, whose product with sampling interval s yields the intended device length, in a manner suitable for the inverse-DFT operation. This can be done by "sampling" the continuous version of the Fourier-domain specifications at certain points, or, alternatively, by "drawing" the specification directly in the form suitable for the DFT. The inverse-DFT of the array is then calculated. Various forms of "smoothing" can be applied to the resulting waveform in order to reduce oscillatory features between the frequency samples.

Post-synthesis

Once the analog profile has been synthesized, it may require several simple yet preferable modifications. One such modification is filtering by a discrete-sum filter, which is demanded by the mathematics of the Fourier approximation. Another simple modification is that the waveform should be scaled to a level appropriate to the upcoming Delta-Sigma modulation stage. This can be as simple as re-scaling the waveform to have an amplitude of unity.

Quantization

The Fourier domain synthesis as presented up to here produces an "analog" grating profile. By its definition, however, the BSG requires a discrete profile utilizing only a small number (usually two) of index values. One technique for the quantization of the grating profile is the Delta-Sigma modulation, discussed previously. Delta-Sigma modulation is a powerful tool for grating synthesis since it is fast, produces good results with little effort, and is well documented in literature. However, other quantization techniques exist and it is important to understand the features that make them appropriate for BSG synthesis.

The key requirement for a quantization method used for BSG synthesis by Fourier methods in accordance with the present invention is that it preferably conserve spectral information in a frequency band of importance. The Delta-Sigma modulation is a preferred way of doing this because it is designed to "filter out" quantization noise from a given frequency band, leaving the spectral information in that band mostly undisturbed. In alternate embodiments any suitable quantization methods may be used, with improvements such as an accounting for grating effects that are not evident in the frequency domain. In any case, the selected quantization method preferably conserves small-amplitude spectral features in the band of importance, this is demanded by the Fourier approximation, which becomes more exact in the small-amplitude domain.

Thus, those skilled in the art will appreciate that the method of BSG synthesis using Fourier techniques disclosed herein is therefore not restricted to Delta-Sigma quantization. Rather, the Fourier approach to quantization lays out certain requirements on the quantization technique, namely those mentioned in the above paragraph, without requiring that a specific method be used.

Error Feedback and Iteration

Once the grating has been quantized, its synthesis is essentially complete. The grating's performance can be evaluated using a standard test such as the transfer matrix method. This characterization can be more computationally intensive than synthesis itself. Fourier methods of synthesis are sufficiently accurate that gratings at this stage are satisfactory for many applications. However, in some situations better results are required. In such situations, performance improvements are most readily obtained by error feedback and iteration.

Synthesis error refers to the difference between the desired reflectance spectrum and the spectrum measured by the transfer matrix method. The designer may evaluate this error and use it to "correct" the design by subtracting the error from the grating's frequency-domain specifications. The new specifications can then be used to repeat the synthesis process and generate an improved grating. Alternatively, the error, which is measured in the frequency domain, can be appropriately transformed into the spatial domain and added to the analog grating profile (the grating before quantization). This latter form is a general and powerful technique that can be utilized independently of the synthesis method used in the frequency domain.

The error feedback process can be repeated as desired, but a single iteration is often sufficient. The convergence of the feedback process for small-amplitude frequency regions is guaranteed by the Fourier approximation. However, one must be cautious not to invest considerable grating resources to correct features that are intrinsic to the reflectance spectrum. For instance, certain peaks have characteristic shapes to which they distort in the reflectance domain. Error feedback may be able to correct this distortion, but can require considerable grating resources to do so, while the designer may consider this distortion as inconsequential. In addition, the designer should not let the error feedback process attempt to perfectly match the shape of passband to stopband transition regions between the Fourier and reflectance domains, it may simply be impossible, and it is usually inconsequential. Thus, the designer may prefer to use a weighted version of the synthesis error for the feedback process.

The gratings computationally synthesized according to the method disclosed herein are then "written" into an optical wave-guide using a variety of methods depending on the waveguide material which will be known to those skilled in the art. Fiber or glass waveguides guides may be used in which case the refractive index modulation is accomplished by exposing them to high intensity light (typically in the ultraviolet). The supergratings may be implemented in semiconductor gratings as surface-relief gratings by etching a grating pattern into the surface of the semiconductor guide (which may then be buried following subsequent deposition).

Special Synthesis Techniques

There are two useful synthesis "tricks" that rely on the sampled nature of the BSG and its resulting properties. These are Induced-Symmetry Synthesis and Super-Nyquist Synthesis.

a) Induced-symmetry Synthesis

An elementary property of sampled signals is that their Fourier spectrum displays a symmetry about integer multiples of a characteristic frequency known as the Nyquist frequency. In certain applications, such as filters with large numbers of identical peaks, a similar symmetry exists in the reflectance specification. The principle of Induced-Symmetry Synthesis is that the symmetry of the reflectance specifications can be reproduced by the symmetry about the Nyquist frequency, such that the grating's resources need only be used to create one half of the spectral features.

A good example for this method is the synthesis of a filter with ten equally spaced reflectance peaks. Using the principle of Induced-Symmetry Synthesis, the designer may choose a sampling length that places the Nyquist frequency precisely in the middle of the ten peaks, that is, on the line of symmetry of the specifications. The designer may then proceed to synthesize a grating for the five lower peaks. The upper five peaks appear automatically due to the Frequency-domain symmetry.

b) Super-Nyquist Synthesis

It is often the case that the required resolution for grating inscription appears to exceed the available resolution. For example, when designing a BSG for the 1550 nm wavelength range in a Gallium-Arsenide waveguide with a typical effective index n=3.2, it is convenient to place the Nyquist rate at 1550 nm (to make use of Induced-Symmetry Synthesis, for example), which corresponds to a sample length of about 120 nm. This feature size is too small for optical photolithography, and requires the use of the more expensive electron-beam lithography. The added difficulty associated with electron-beam lithography is, of course, undesirable, and the designer may wish to increase the sample length.

At first glance, increasing the sample length does not seem possible: Nyquist sampling theory restricts sampled information to frequencies below the Nyquist rate and increasing the sample length places the grating's characteristics above this rate. This observation is not correct: Nyquist sampling theory does not restrict the information in a sampled signal to below the Nyquist limit, but rather states that the frequency content above the limit consists of repeated copies, known as images, of the spectral information below the limit. This leads to the principle of Super-Nyquist Synthesis: grating features above the Nyquist rate may be generated by synthesizing their image below the Nyquist frequency. This essentially corresponds to the notion of higher order reflection in conventional Bragg grating theory.

Super-Nyquist Synthesis is useful, for example, for reducing the resolution required for the 1550 nm Gallium-Arsenide grating discussed above. Choosing "third order" synthesis, the designer may select the sample length such that the 1550 nm region corresponds to three times the Nyquist frequency. The designer can then shift the Fourier domain grating characteristics by integer multiples of the sampling rate (twice the Nyquist frequency), such that they are in the "baseband", below the Nyquist frequency. A grating synthesized for these shifted characteristics will display grating characteristics where intended, just below three times the Nyquist frequency, due to the phenomenon of imaging. Furthermore, the sample length for this new grating is 360 nm, which is much more appropriate for optical lithography.

The advantage of Super-Nyquist Synthesis is the reduction in resolution requirements that it affords. It also, however, has several drawbacks, the most notable being that any increase in required resolution is accompanied by an identical increase in the device length.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

It should be understood that the foregoing description is only illustrative of the invention. Various alternatives and modifications can be devised by those skilled in the art without departing from the invention. For example, the design steps may be embodied in a computer system or a computer readable medium for causing a computer to generate a supergrating in accordance with features of the present invention. Accordingly, the present invention is intended to embrace all such alternatives, modifications and variances that fall within the scope of the appended claims.

What is claimed is:

1. A method for designing a waveguide supergrating, the method comprising:

specifying a reflectance spectrum in at least one spectral band to be produced by a supergrating in a waveguide, the reflectance spectrum having specified reflectance features;

generating an analog refractive index profile corresponding to the specified reflectance spectrum; and transforming said analog refractive index profile to a quantized refractive index profile using a transformation that conserves Fourier-domain information within said at least one spectral band, wherein the said quantized refractive index profile comprises a finite plurality of refractive indexes.

2. A method according to claim 1 wherein generating said analog refractive index profile further comprises transforming said reflectance spectrum to a Fourier-domain representation having Fourier-domain features.

3. A method according to claim 2 wherein transforming said reflectance spectrum to a Fourier-domain representation having Fourier-domain features further comprises setting Fourier-domain features equal to said specified reflectance features.

4. A method according to claim 3 wherein transforming said reflectance spectrum to a Fourier-domain representation further comprises:

relating the specified reflectance spectrum to a spatial-frequency spectrum to be produced by the supergrating, wherein the reflectance spectrum is plotted as a function of optical frequency $v=c/\lambda$ and the spatial frequency spectrum is plotted as a function of spectral frequency $1/\Lambda$, where $\Lambda$ is spatial period, and wherein $1/\Lambda=2n/\lambda$, wherein n is an average effective index of refraction and is a function of wavelength $\lambda$.

5. A method according to claim 2 wherein the process of transforming said reflectance spectrum to the Fourier-domain representation comprises applying at least one non-linear scaling factor to said reflectance spectrum in order to compensate for inaccuracies in said Fourier-domain representation.

6. A method according to claim 2 wherein generating the analog refractive index profile further comprises determining a Fourier transform of said Fourier-domain representation.

7. A method according to claim 6 wherein determining a Fourier transform of said Fourier-domain representation further comprises transforming the analog refractive index profile according to a Discrete Fourier Transform (DFT).

8. A method according to claim 7, wherein the DFT is implemented using a Fast Fourier transform (FFT).

9. A method according to claim 2 wherein generating the analog refractive index profile corresponding to the Fourier-domain representation further comprises:

determining an actual reflectance of the supergrating; and iteratively calculating a synthesis error difference between said actual reflectance and said Fourier-domain representation for use as feedback to improve said Fourier-domain representation.

10. A method according to claim 9 wherein the reflectance of the designed supergrating is calculated using a transfer matrix method.

11. A method according to claim 9 wherein generating the analog refractive index profile corresponding to the specified reflectance spectrum further comprises:

transforming said synthesis error difference to the spatial domain, thereby forming a transformed error difference; and adding said second transformed error difference to the analog refractive index.

12. A method according to claim 11, wherein the reflectance of the designed supergrating is calculated using a transfer matrix method.

13. A method according to claim 2 wherein transforming said reflectance spectrum to the Fourier-domain representation comprises applying at least one finite-impulse-response filter.

14. A method according to claim 1 wherein the quantized refractive index profile representation comprises a spatial sampling interval greater than $\lambda/4n$, wherein n is an average effective index of refraction and is a function of wavelength $\lambda$.

15. A method for designing a waveguide supergrating, the method comprising:
   specifying a reflectance spectrum in at least one spectral band to be produced by a supergrating in a waveguide, the reflectance spectrum having specified reflectance features;
   generating an analog refractive index profile corresponding to the specified reflectance spectrum; and
   transforming said analog refractive index profile to a quantized refractive index profile using a transformation that conserves Fourier-domain information within said at least one spectral band, wherein the said quantized refractive index profile comprises a finite plurality of refractive indexes;
   wherein generating an analog refractive index profile further comprises:
      deriving a superposition of profiles corresponding to a set of preselected wavelengths and band shapes given by:

$$\sum_i F_i(x + \Delta x_i)\sin(k_i x + \phi_i)$$

where $F_i$, $k_i$, $\phi_i$, $\Delta x_i$ are the envelope function, frequency, phase and envelope shift of the $i^{th}$ profile respectively, and x is the position along the profile; and
      selecting envelope functions ($F_i$), frequencies ($k_i$), phases ($\phi_i$) and envelope shifts ($\Delta x_i$) of component profiles.

16. A method according to claim 15 wherein selecting the phases ($\phi_i$) and envelope shifts ($\Delta x_i$) of component profiles further comprises selecting phases ($\phi_i$) and envelope shifts ($\Delta x_i$) to result in a substantially flat profile envelope for said superposition of profiles.

17. A method according to claim 15 wherein said reflectance spectrum includes at least one bandpass channel.

18. A method for designing a waveguide supergrating, the method comprising:
   specifying a reflectance spectrum in at least one spectral band to be produced by a supergrating in a waveguide, the reflectance spectrum having specified reflectance features;
   generating an analog refractive index profile corresponding to the specified reflectance spectrum; and
   transforming said analog refractive index profile to a quantized refractive index profile using a transformation that conserves Fourier-domain information within said at least one spectral band, wherein the said quantized refractive index profile comprises a finite plurality of refractive indexes wherein said reflectance spectrum is symmetrical about a central value $n_{central}/\lambda_{central}$ (wherein $n_{central}$ is the average effective index of refraction at wavelength $\lambda_{central}$), when plotted as a function of $n/\lambda$, wherein n is an average effective index of refraction and is a function of wavelength $\lambda$.

19. A method according to claim 18 wherein the quantized refractive index profile representation comprises a spatial sampling interval substantially equal to $\lambda_{central}/4n_{central}$, wherein $n_{central}$ is the average effective index of refraction at wavelength $\lambda_{central}$.

20. A method according to claim 18 wherein the quantized refractive index profile representation comprises a spatial sampling interval corresponding to a multiple of $\lambda_{central}/4n_{central}$.

21. A waveguide comprising at least one supergrating, wherein the at least one supergrating exhibits refractive properties according to at least one effective refractive index profile corresponding to a specified reflectance spectrum in at least one spectral band, the at least one effective refractive index profile substantially corresponding to a quantization of an analog index profile, wherein the quantization substantially conserves Fourier-domain information within said at least one spectral band.

22. A waveguide as in claim 21 herein the supergrating comprises a surface relief supergrating having at least one recessed area and at least one non-recessed area, each area having a width, length, and depth, wherein the at least one recessed area and the at least one non-recessed area are adapted to generate the at least one effective refractive index profile.

23. A waveguide as in claim 22 wherein the at least one recessed area comprises a plurality of recessed areas, wherein the depth of each of the plurality of recessed areas is substantially equal.

24. A waveguide as in claim 22 wherein the at least one recessed area comprises a finite plurality of recessed areas.

25. A waveguide as in claim 22 wherein the length of each recessed and non-recessed area substantially equals an integer multiple of a predetermined unit.

26. A waveguide as in claim 21 wherein the waveguide includes at least one optical fiber.

27. A waveguide comprising at least one supergrating, wherein the at least one supergrating exhibits refractive properties according to at least one effective refractive index profile corresponding to a specified reflectance spectrum in at least one spectral band, the at least one effective refractive index profile substantially corresponding to a quantization of an analog index profile, wherein the quantization substantially conserves Fourier-domain information within said at least one spectral band wherein the at least one effective refractive index profile corresponding to the quantization of the analog index profile further comprises the at least one effective refractive index profile corresponding to a Delta Sigma Modulation quantization of an analog index profile.

28. A program storage device readable by a machine, tangibly embodying a program of instructions executable by the machine to perform a method for designing a waveguide, supergrating, said method comprising:
   specifying a reflectance spectrum in at least one spectral band to be produced by a supergrating in a waveguide, the reflectance spectrum having specified reflectance features;
   generating an analog refractive index corresponding to the specified reflectance spectrum; and
   transforming said analog refractive index profile to a quantized refractive index profile using a transformation that conserves Fourier-domain information within said at least one spectral band, wherein the said quantized refractive index profile comprises a finite plurality of refractive indexes.

29. A method for designing a waveguide supergrating, the method comprising:
   specifying a reflectance spectrum in at least one spectral band to be produced by a supergrating in a waveguide, the reflectance spectrum having specified reflectance features;
   generating an analog refractive index profile corresponding to the specified reflectance spectrum without trans forming said reflectance spectrum to a Fourier-Domain-representation; and transforming said analog refractive index profile to a quantized refractive index profile using a transformation that conserves Fourier-domain information within said at least one spectral band, wherein the said quantized refractive index profile comprises a finite plurality of refractive indexes.

30. A method according to claim 29 wherein the transforming step comprises using a digital quantizer that substantially conserves Fourier-domain information within at least one spectral band.

31. A method as in claim 30 wherein the digital quantizer comprises a Delta-Sigma modulator.

32. A method according claim 29 wherein generating an analog refractive index profile further comprises:

deriving a superposition of sinusoidal components corresponding to a set of preselected wavelengths given by:

$$\sum a_i \cos(\omega_i x_i + \phi_i) \quad \text{(Eq. 3)}$$

where $a_i$, $\omega_i$, and $\phi_i$ are the amplitude, frequency and phase of an $i^{th}$ sinusoid respectively, and x is the position along the profile; and selecting amplitudes, frequencies, and phases of component sinusoids.

33. A method according to claim 32 wherein selecting the phases of component sinusoids further comprises selecting the phases to result in a substantially flat profile envelope for the superimposed sinusoids.

34. Manufacturing a waveguide supergrating comprising:

designing the waveguide supergrating as in claim 29; and forming the waveguide supergrating in a substrate.

35. A program storage device readable by a machine, tangibly embodying a program of instructions executable by the machine to perform a method for designing a waveguide supergrating, said method comprising:

specifying a reflectance spectrum in at least one spectral band to be produced by a supergrating in a waveguide, the reflectance spectrum having specified reflectance features;

generating an analog refractive index corresponding to the specified reflectance spectrum without transforming said reflectance spectrum to a Fourier-Domain representation; and transforming said analog refractive index profile to a quantized refractive index profile using a transformation that conserves Fourier-domain information within said at least one spectral band, wherein the said quantized refractive index profile comprises a finite plurality of refractive indexes.

* * * * *

UNITED STATES PATENT AND TRADEMARK OFFICE
CERTIFICATE OF CORRECTION

PATENT NO. : 6,657,786 B2
DATED : December 2, 2003
INVENTOR(S) : Levner et al.

It is certified that error appears in the above-identified patent and that said Letters Patent is hereby corrected as shown below:

<u>Column 16,</u>
Line 10, delete "herein" and replace with -- wherein --.

Signed and Sealed this

Fifteenth Day of June, 2004

JON W. DUDAS
*Acting Director of the United States Patent and Trademark Office*